United States Patent
McCollam

(10) Patent No.: US 8,142,588 B2
(45) Date of Patent: Mar. 27, 2012

(54) METHOD FOR APPLYING TAPE LAYER TO OUTER PERIPHERY OF SPIRAL WOUND MODULE

(75) Inventor: Robert P. McCollam, Roseville, MN (US)

(73) Assignee: Dow Global Technologies LLC, Midland, MI (US)

( * ) Notice: Subject to any disclaimer, the term of this patent is extended or adjusted under 35 U.S.C. 154(b) by 23 days.

(21) Appl. No.: 12/903,245

(22) Filed: Oct. 13, 2010

(65) Prior Publication Data

US 2011/0094660 A1    Apr. 28, 2011

Related U.S. Application Data

(60) Provisional application No. 61/255,121, filed on Oct. 27, 2009.

(51) Int. Cl.
 *B65H 81/00* (2006.01)
 *B29C 63/06* (2006.01)
(52) U.S. Cl. ......... 156/187; 156/184; 156/185; 156/193
(58) Field of Classification Search ................ 156/184, 156/185, 187, 193
See application file for complete search history.

(56) References Cited

U.S. PATENT DOCUMENTS

| | | |
|---|---|---|
| 3,562,050 A * | 2/1971 | Hake et al. .................... 156/215 |
| 4,021,351 A | 5/1977 | Bray |
| 4,116,738 A | 9/1978 | Pall |
| 4,277,344 A | 7/1981 | Cadotte |
| 4,517,085 A | 5/1985 | Driscoll et al. |
| 4,765,897 A | 8/1988 | Cadotte et al. |
| 4,888,116 A | 12/1989 | Cadotte et al. |
| 4,964,998 A | 10/1990 | Cadotte et al. |
| 5,108,604 A | 4/1992 | Robbins |
| 5,114,582 A | 5/1992 | Sandstrom et al. |
| 5,152,855 A | 10/1992 | Jansman et al. |
| 5,266,195 A | 11/1993 | Hopkins |
| 5,380,433 A * | 1/1995 | Etienne et al. .......... 210/321.79 |
| 5,538,642 A | 7/1996 | Solie |
| 5,658,460 A | 8/1997 | Cadotte et al. |
| 5,755,964 A | 5/1998 | Mickols |
| 5,876,602 A | 3/1999 | Jons et al. |
| 5,882,752 A | 3/1999 | Yoneda |
| 6,066,254 A | 5/2000 | Huschke et al. |
| 6,280,853 B1 | 8/2001 | Mickols |
| 6,718,853 B2 | 4/2004 | Butterworth |
| 6,878,278 B2 | 4/2005 | Mickols |

(Continued)

FOREIGN PATENT DOCUMENTS

| | | |
|---|---|---|
| JP | 2000342939 | 12/2000 |
| JP | 2005279556 | 10/2005 |
| WO | 2007067751 | 6/2007 |

OTHER PUBLICATIONS

U.S. Appl. No. 12/332,464, Robert P. McCollam, Fluid Filter Assembly Including Seal, Dec. 11, 2008., (pending, commonly owned, shares at least one common inventor).

*Primary Examiner* — Khanh P Nguyen
*Assistant Examiner* — Carson Gross
(74) *Attorney, Agent, or Firm* — Edward W. Black

(57) ABSTRACT

Means and methods for applying a tape layer from a roll to the outer periphery of a spiral wound module. In preferred embodiments the length of the tape coincides with the length of the module.

3 Claims, 5 Drawing Sheets

U.S. PATENT DOCUMENTS

| | | |
|---|---|---|
| 6,881,336 B2 | 4/2005 | Johnson |
| 2004/0124133 A1 | 7/2004 | Irie et al. |
| 2005/0173319 A1 | 8/2005 | Fritze et al. |
| 2007/0251883 A1 | 11/2007 | Niu |
| 2008/0185332 A1 | 8/2008 | Niu et al. |
| 2009/0026130 A1 | 1/2009 | Chikura et al. |
| 2009/0159527 A1 | 6/2009 | Mickols et al. |
| 2009/0194479 A1 | 8/2009 | Niu et al. |

\* cited by examiner

METHOD FOR APPLYING TAPE LAYER TO OUTER PERIPHERY OF SPIRAL WOUND MODULE

CROSS REFERENCE STATEMENT

This application claims the benefit of U.S. Provisional Application No. 61/255,121, filed Oct. 27, 2009, the entire content of which is incorporated herein by reference.

TECHNICAL FIELD

The present invention is directed toward means and methods for applying a tape layer to the outer periphery of a spiral wound module.

DESCRIPTION OF THE RELATED ART

Spiral wound modules (also referred to as spiral wound "elements") are well known for use in a variety of fluid separations including both gas and liquid phase separations. Due to their spiral configuration, a relatively large membrane surface area can be packed into an individual module. Depending upon the specific membrane used, spiral wound modules can be used in a wide variety of applications including: reverse osmosis (RO), nanofiltration (NF), ultrafiltration (UF) and microfiltration (MF). Examples of common liquid separations include the treatment of liquid feeds such as the concentration and/or salt removal in food, dairy and sweetener feeds; desalination of water, removal of divalent ionic species such as calcium and barium ions, and removal of larger constituents such as cysts, viruses, and pesticides. A typical module includes a permeate collection tube, at least one but often a plurality membrane envelopes and an outer cover or housing. Spiral wound modules are available in a variety of sizes; however, for home drinking water treatment units modules typically have a length of from about 15 to 45 cm and a diameter of from about 3.5 to 5 cm. For a typical 5 cm diameter module, one to three membrane envelops are wound around the permeate collection tube. Commercially available examples of such spiral wound modules include model TW30-1812 (24, 36, 50 and 75) from the FilmTec Corporation.

Spiral wound modules commonly include an outer tape layer which maintains the membrane envelope(s) in a spiral wound configuration and which may further serve as an outer cover or housing for the module. Applicable tapes include pressure sensitive tapes applied from a roll. One known application technique involves helically winding a relatively narrow width of tape about the outer periphery of the module, as illustrated in FIG. 2A. This technique is time intensive given the number of winds necessary to cover the outer periphery of the module. Another known technique illustrated in FIG. 2B utilizes a relatively wide tape which covers the outer periphery of the spiral wound module in a single pass. That is, the width (W) of the tape coincides with the length (L) of the spiral wound module such that the tape covers the outer periphery in one rotation about the module. While the technique illustrated in FIG. 2B requires less time to complete, it is practically limited for use with relatively short modules due to the limited availability of tape rolls of large width. Moreover, as the width of the tape roll increases it becomes increasingly difficult to overcome the adhesion force necessary to dispense the tape from the roll. As a consequence, the technique illustrated in FIG. 2B becomes less practical as the length of the module increases, particularly module lengths greater than 50 cm, 100 cm, 150 cm and 225 cm.

STATEMENT OF THE INVENTION

The present invention is directed toward means and methods for applying a tape layer to the outer periphery of a spiral wound module. Many embodiments are disclosed.

BRIEF DESCRIPTION OF THE DRAWINGS

The invention and various embodiments may be better understood by reference to the detailed description and accompanying figures wherein like reference numerals refer to like elements between the various views.

DETAILED DESCRIPTION OF THE INVENTION

Figure 1:
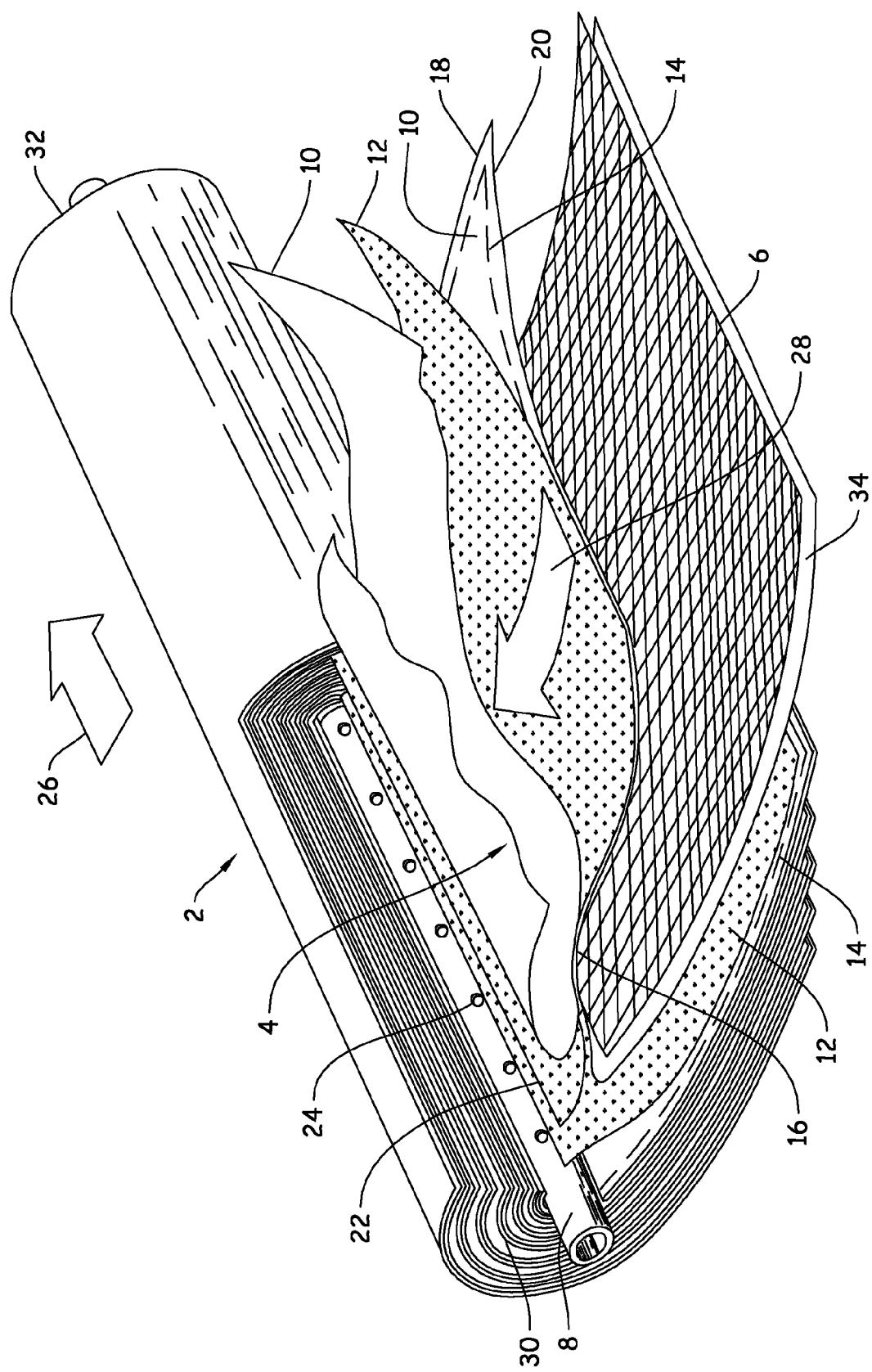
FIG. 1 is a perspective, partially cut-away view of a spiral wound module.

The present invention includes a method for applying a tape layer to the outer periphery of a spiral wound module. The tape layer is not particularly limited but is preferably applied from a roll. For purposes of this description, the width of the tape corresponds to the width of the roll; whereas the length of the tape corresponds to the amount of tape removed from the roll. That is, while the width of the tape is fixed by the width of the roll, the length of the tape is variable depending upon the portion of tape tangentially "dispensed" from the roll. While not particularly limited, tapes having thickness of from approximately 0.075 to 0.15 mm have been found acceptable for most embodiments. In addition to maintaining the module within a spiral wound configuration, in some embodiments the tape layer may also provide support to the module during operation. For example, some applications involve operating the module under high feed pressures. In such embodiments, tapes having relatively high tensile strengths may be preferred. In this regard, bi-directional tapes are advantageous. However, for most low pressure, household-type applications, tapes having tensile strengths above about 30 N/mm are acceptable. Applicable tapes include those which comprise a polymer backing (e.g. polypropylene, polyester, etc.) with an adhesive (e.g. acrylic, synthetic rubber resin, etc.) provided upon at least a portion of one side. Preferred tapes include pressure sensitive tapes having a non-adhesive front side and an adhesive covered back side. The adhesive need not be applied to the entire back side of the tape. Moreover, the type of adhesive need not be pressure sensitive.

For purposes of the present invention, the spiral wound module is not particularly limited and includes modules such as those commonly used in home water treatment systems which typically have a diameter of approximately 3.5 to 5 cm. By way of more detailed description, a spiral wound module suitable for use in the present invention is generally shown at 2 in FIG. 1. The module (2) is formed by winding one or more membrane envelopes (4) and optional feed channel spacer sheet(s) ("feed spacers") (6) about a permeate collection tube (8). Each membrane envelope (4) preferably comprises two substantially rectangular membrane sheets (10) surrounding a permeate channel spacer sheet ("permeate spacer") (12). This sandwich-type structure is secured together, e.g. by sealant (14), along three edges (16, 18, 20) to form an envelope while the fourth edge (22) abuts the permeate collection tube (8) so that the inside portion of the envelope (and optional permeate spacer (12)) is in fluid communication with a plurality of openings (24) extending along the length of the permeate collection tube (8). In one preferred embodiment, the module (2) comprises a plurality of membrane envelops (4) separated by a plurality of feed spacers sheets (6). Membrane envelops (4) are commonly formed by joining the back side surfaces of adjacently positioned membrane leaf packets, wherein each leaf packet comprises a substantially rectangular membrane sheet (10) folded upon itself to define two membrane "leaves" wherein the front sides (34) of each leaf are facing each other and the fold is axially aligned with the fourth edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid in an axial direction (i.e. parallel with the permeate collection tube (8)) through the module (2). In this embodiment, the membrane envelope (4) is formed by joining the back sides of two adjacently positioned membrane leaves. While not shown, additional intermediate layers may also be included in the assembly.

During module fabrication, permeate spacer sheets (12) may be attached about the circumference of the permeate collection tube (8) with membrane leaf packets interleaved therebetween. The back sides of adjacently positioned membrane leaves are sealed about portions of their periphery (16, 18, 20) to enclose the permeate spacer sheet (12) to form a membrane envelope (4). The membrane envelope(s) (4) and feed spacer(s) (6) are wound or "rolled" about the permeate collection tube (8) to form two opposing scroll faces (30, 32) at opposing ends. The sealant (14) used for sealing the edges (16, 18, 20) of the membrane envelope (4) preferably permits relative movement of the various sheet materials during the winding process. That is, the cure rate or period of time before which the sealant (14) becomes tacky is preferably longer than that required to assemble and wind the membrane envelopes (4) about the permeate collection tube (8). For purposes of this description, the length of the spiral wound module refers to the distance between the opposing ends of the module, i.e. the linear distance from one scroll face (30) to the other (32).

Arrows shown in FIG. 1 represent the approximate flow directions (26, 28) of feed and permeate during operation. Feed fluid enters the module (2) from an inlet scroll face (30) and flows across the front side(s) 34 of the membrane sheet(s) (10) and exits the module (2) at the opposing outlet scroll face (32). Permeate fluid flows along the permeate spacer sheet (12) in a direction approximately perpendicular to the feed flow as indicated by arrow (28). Actual fluid flow paths vary with details of construction and operating conditions.

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. Representative feed spacers are described in more detail in U.S. Pat. No. 6,881,336 to Johnson. Representative example feed spacers include polyethylene, polyester, and polypropylene mesh materials such as those commercially available under the trade name VEXAR™ from Conwed Plastics. Additional details regarding various components and construction of spiral wound modules are provided in the literature see for example: U.S. Pat. No. 5,538,642 to Solie which describes a technique for attaching the permeate spacer to the permeate collection tube, WO 2007/067751 to Jons et. al which describes trimming operations and the use of a UV adhesive for forming an insertion point seal.

For purposes of the present invention, the type of membrane sheet is not particularly limited. The selection of membrane sheet is based on the specific application, feed source, solute, and foulants. While RO and NF flat sheet membranes have been formed from many different materials (e.g. cellulose acetate materials, polysulfone, polyether sulfone), the most commercially successful membranes have been thin film composite membranes. One preferred composite membrane sheet is FilmTec Corporation's FT-30™ membrane. Commercial thin film composite membranes typically comprises a bottom layer (back side) of a nonwoven polyester material web (e.g. PET scrim), a middle layer of a microporous polymer such as polysulfone having a thickness of about 25-125 microns, and top layer (front side) comprising a thin film polyamide layer having a thickness less than about 1 micron and more commonly from about 0.010 to 0.1 micron. The polyamide layer is preferably created by an interfacial polycondensation reaction between a polyfunctional amine monomer and a polyfunctional acyl halide monomer upon the surface of the microporous polysulfone as described in U.S. Pat. Nos. 4,277,344 and 5,658,460 to Cadotte et al; and U.S. Pat. No. 6,878,278 to Mickols. Methods of modifying such polyamide membranes are described in U.S. Pat. No. 5,876,602 to Jons et. al.; U.S. Pat. No. 5,755,964, U.S. Pat. No. 6,280,853 and US 2009/0159527 to Mickols; U.S. Pat. No. 4,888,116; U.S. Pat. No. 4,765,897; U.S. Pat. No. 4,964,998 to Cadotte et. al. and US 2007/0251883, US 2008/0185332 and US 2009/0194479 to Niu et al. RO and NF type membrane sheets are preferred for use in the present invention.

Figure 2A:
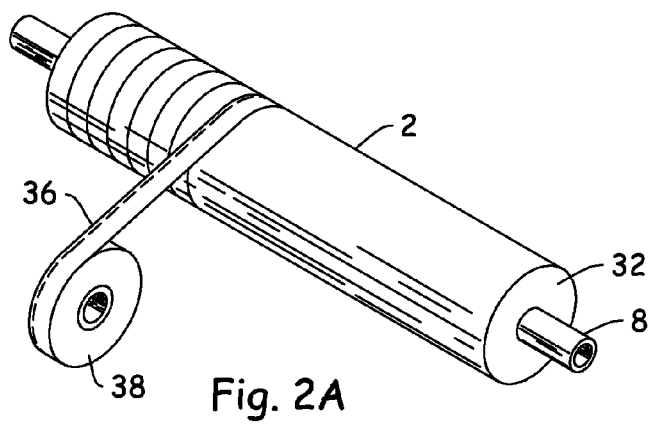
FIG. 2A is perspective idealized view showing a prior art technique of applying a tape layer about the periphery of a spiral wound module.
Figure 2B:
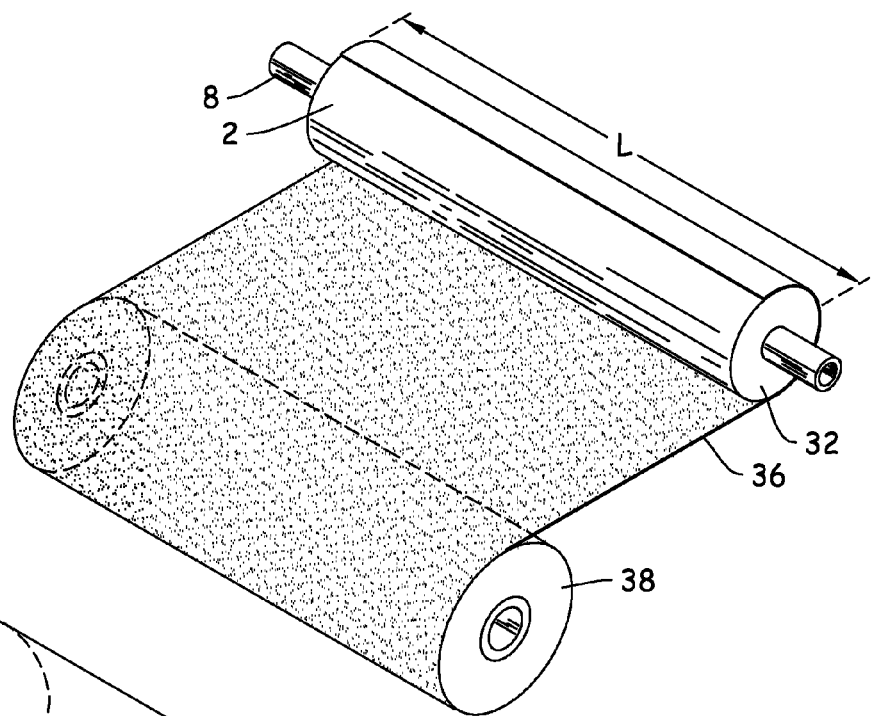
FIG. 2B is perspective idealized view showing another prior art method of applying a tape layer about the periphery of a spiral wound module.
Figure 2C:
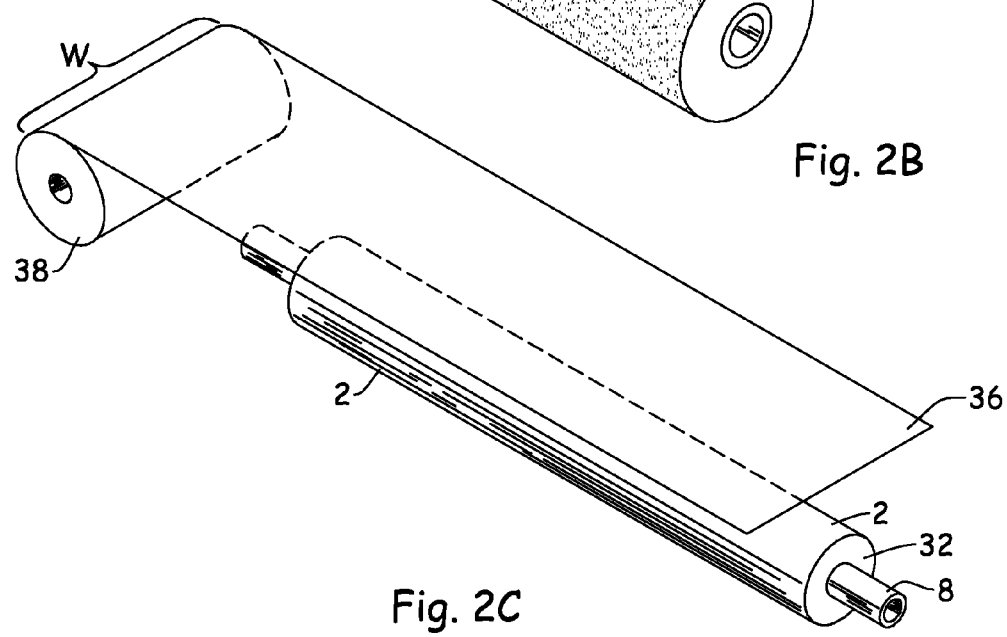
FIG. 2C is perspective idealized view showing one embodiment of the subject method of applying a tape layer about the periphery of a spiral wound module.

With reference to FIG. 2C, the present invention includes a method for applying a tape layer (36) from a roll (38) to the outer periphery of the spiral wound module (2). For purposes of this description, the term "outer periphery" refers to the cylindrical outer surface area of the module (2) but does not include the scroll faces (30, 32). In a preferred embodiment, a length of tape from the roll (38) is applied to the outer periphery of the spiral wound module (2) in a manner such that the length of tape (36) coincides with the length of the spiral wound module (2). For purposes of this description, the term "coincides" means that the length direction of both the tape (36) and module (2) are approximately parallel to each other, and while not required, are also preferably of approximately the same length, e.g. the tape (36) is preferably the same or slightly longer (e.g. preferably less than 10% longer) than the length of the spiral wound module (2). Once applied, the tape (36) preferably forms a layer about the majority, and more preferably the entire outer periphery of the spiral wound module (2). The width (W) of the tape (2) is preferably equal to or greater than the circumference of the spiral wound module (2) such that the tape (36) wraps about at least 90% and more preferably 100% of the circumference of the outer periphery of the spiral wound module (2). In some embodiments, the width (W) of the tape is at least 10% or even 25% greater than the circumference of the spiral wound module (2) such that the tape (36) may be overlap upon itself once applied about the outer periphery of the spiral wound module (2). However, in an alternative embodiment the width of the tape (2) may be less than the circumference of the spiral wound module (2); in which case multiple parallel and adjacently aligned strips of tape may be applied along the length of the module in order that tape covers the majority and preferably entire circumference of the module.

Figure 3A:
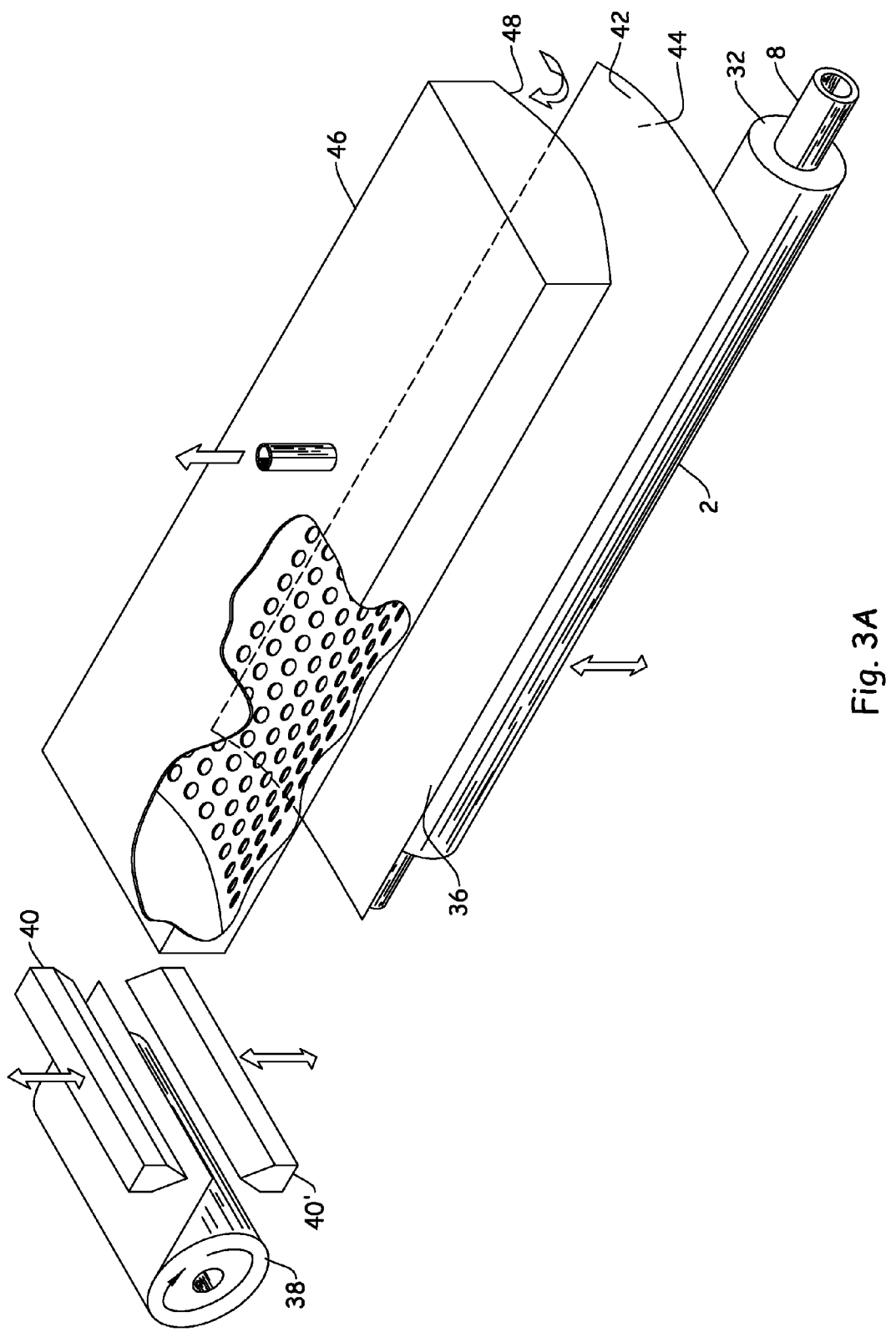
FIG. 3A is a perspective view of an idealized set-up for practicing one embodiment of the invention showing the alignment of an unrolled length of tape with a spiral wound module.
Figure 3B:
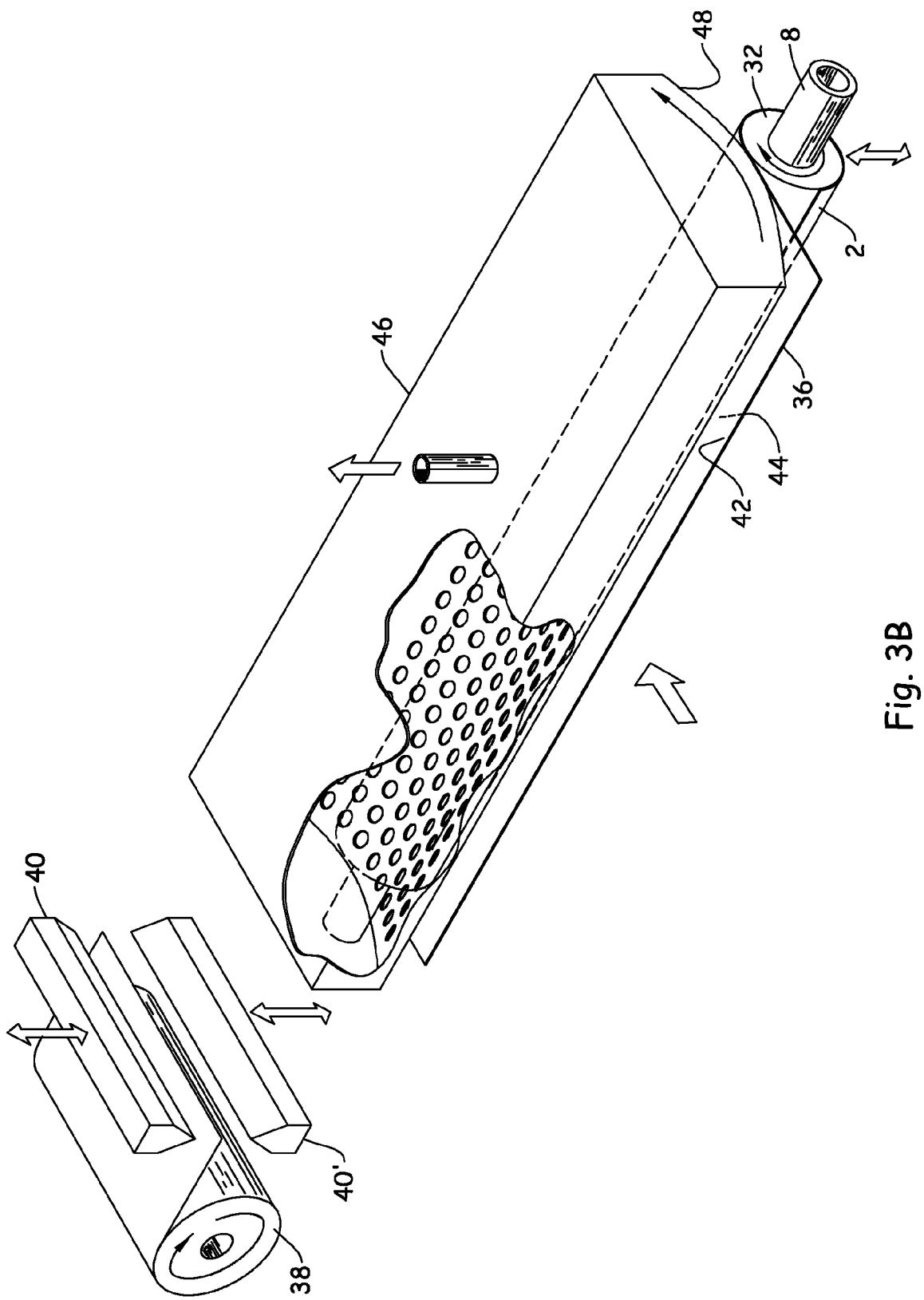
FIG. 3B is a perspective view of the set-up of FIG. 3A showing the application of an unrolled length of tape to the outer periphery of a spiral wound module.

While tape may be applied to the module as it is unrolled from the roll (e.g. by contacting a free edge of the tape to one end of the module and simultaneous contacting the tape to the outer periphery of the module as the tape is unrolled along the length of the module), a length of tape is preferably unrolled from the roll prior to the step of applying the tape to the module. Preferably, the length of unrolled tape corresponds to the length of the spiral wound module, i.e. is within 10% of the length of the module but is preferable equal to or slightly longer than the module. While not required, the unrolled tape is preferable cut, torn, or otherwise separated from the roll prior to being applied to the outer periphery of the spiral wound module. The manner in which the unrolled tape is contacted with the module is not particularly limited. In one preferred embodiment, the unrolled tape is first aligned with the spiral wound module prior to being contacted with its outer periphery. For example, a length of unrolled tape is cut from a roll and linearly aligned along an axis which is spaced from and parallel to the spiral wound module (i.e. parallel to the axis defined by the permeate collection tube) such that the length of the tape coincides with the length of the module. Once aligned, the unrolled tape is contacted with the outer periphery of the spiral wound module. By way of illustration, FIGS. 3A and 3B depict an idealized set-up for practicing one embodiment of the subject method. As shown, tape (36) is unrolled from roll (38) and cut with movable blades (40, 40') to a length corresponding to the length of the spiral wound module (2). The unrolled length of tape (36) is then aligned with spiral wound module (2) by drawing the front side (42) of the tape (36) against a press (46) (as indicated by a curved arrow in FIG. 3A), such as by way of drawing negative pressure (i.e. vacuum) through the press (46) (as indicated by an upward arrow), and locating the press (46) in a spaced apart and aligned position relative to the spiral wound module (2). As illustrated, the press (46) comprises a vacuum drum including a convex surface (48) for drawing the front side (42) of the tape (36). As best shown in FIG. 3B, once aligned, the back side (44) of the tape (36) is contacted to the outer periphery of the module (2) by moving one or both the press (46) and module (2) together, (as indicated by a bi-directional vertical arrow), into contact with each other with the unrolled tape (36) located therebetween. Once in contact, the unrolled tape (36) is subsequently applied to the outer periphery of the module (2) by counter rotating the press (46) and module (2) (as indicated by curved arrows in FIG. 3B) while maintaining contact between the press (46) and module (2).

Figure 4:
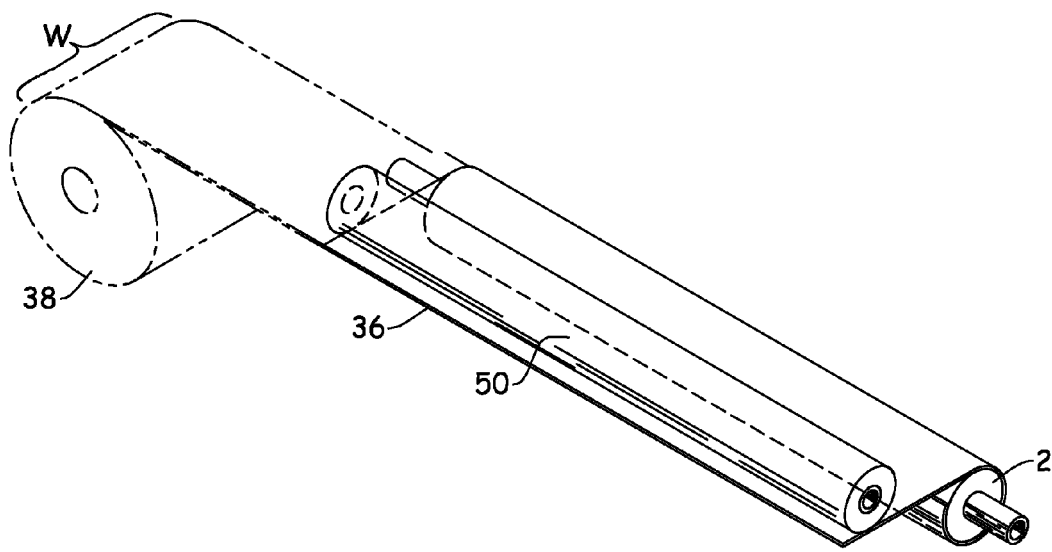
FIG. 4 is a perspective view of an alternative idealized set-up for practicing on embodiment of the subject invention.
Figure 5:
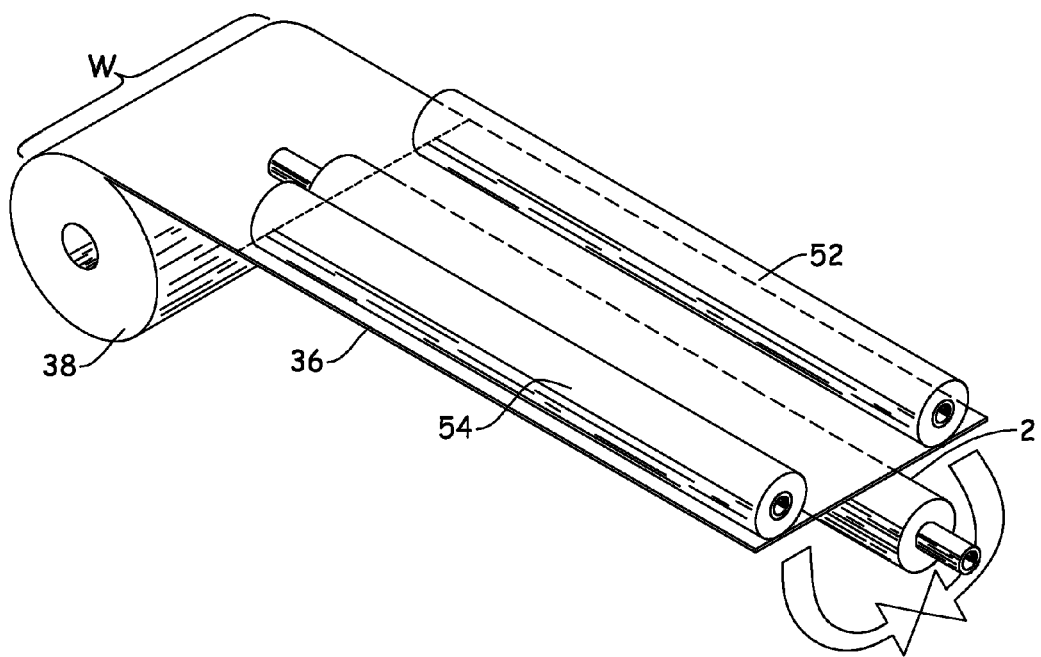
FIG. 5 is a perspective view of another alternative idealized set-up for practicing on embodiment of the subject invention.

FIGS. 4 and 5 illustrate alternative set-ups for practicing embodiments of the invention. Both illustrated embodiments utilize rollers (50, 52, 54) for applying an unrolled length of tape (36) to the outer periphery of a spiral wound module (2). With reference to FIG. 4, a length of tape is unrolled and cut from the roll, linearly aligned, and then contacted with the outer periphery of a spiral wound module (2). A single rotating roller (50) is subsequently brought into contact with the module (2), with the tape (36) located between the roller (50) and module (2). The roller (50) and module (2) are then counter rotated about their respective axes while maintaining contact until the tape (36) forms a layer about the outer periphery of the module (2). In an alternative embodiment, roller (50) may be fixed about its axis. FIG. 5 illustrates a similar set-up utilizing a pair of rollers (52, 54) which counter rotate about the outer circumference of the spiral wound module (as illustrated by curved arrows in FIG. 5). In an alternative embodiment, rollers (52, 54) may be driven by rotation of the module (2) about its axis (defined by the permeate collection tube (8)). In yet another embodiment, the rollers (52, 54) may be fixed about their axes.

The present invention is well suited for applying a tape layer to spiral wound modules and particularly to modules having lengths beyond standard tape widths, e.g. modules longer than 25 cm, 50 cm, 100 cm, 150 cm and 225 cm. Preferably, the length of tape applied to the module is the same or slightly longer in length than the module. Excess tape extending beyond the ends of the module can be trimmed as part of an optional finishing step.

While the specific design of the spiral wound module may vary from that previously described, the spiral wound module preferably includes at least a permeate collection tube extending between two opposing ends and including a plurality of openings along its length, and at least one membrane envelope wound about the permeate collection tube and forming two opposing scroll faces, wherein the membrane envelope is in fluid communication (and preferably in sealing engagement) with the openings along the permeate collection tube. The membrane envelope is not particularly limited and may comprise a wide range of designs, compositions and structures. However, in several preferred embodiments, the membrane envelope comprises a structure which functions as an RO or NF membrane.

The entire content of each of the aforementioned patents and patent applications are incorporated herein by reference.

The invention claimed is:

1. A method for applying a tape layer from a roll to the outer periphery of a spiral wound module comprising a permeate collection tube having a length extending between two opposing ends and at least one membrane envelope wound about the permeate collection tube; wherein the tape includes a front side and back side, wherein at least a portion of the back side includes an adhesive
wherein the method comprises the steps of:
unrolling a length of tape from the roll corresponding to the length of the module,
cutting said length of the tape from the roll,
aligning the length of unrolled tape with the length of the spiral wound module by drawing the front side of the unrolled tape against a press by use of negative pressure, wherein the press is spaced apart and aligned with to the spiral wound module, and
contacting the back side of the tape to the outer periphery of the spiral wound module such that the length of tape coincides with the length of the spiral wound module and wherein a majority of the outer periphery of the spiral wound module is covered with tape.

2. The method of claim 1 wherein the roll of tape has a width equal to or greater than the circumference of the spiral wound module.

3. The method of claim 1 wherein the press has a convex surface for drawing the front side of the unrolled tape, and wherein the back side of the unrolled tape is contacted to the outer periphery of the spiral wound module by moving one or both the press or spiral wound module together into contact with each other with the unrolled tape located therebetween; and wherein the unrolled tape is subsequently applied to the outer periphery of the spiral wound module by counter rotating the press and spiral wound module while maintaining said contact.

* * * * *